US006082096A

United States Patent [19]

Vauchel

[11] Patent Number: 6,082,096

[45] Date of Patent: Jul. 4, 2000

[54] TURBO-JET ENGINE THRUST-REVERSER FITTED WITH SCOOP-DOORS LINKED TO A MOVABLE CASCADE

[75] Inventor: Guy Bernard Vauchel, Le Havre, France

[73] Assignee: Hispano Suiza Aerostructures, France

[21] Appl. No.: 09/265,973

[22] Filed: Mar. 11, 1999

[30] Foreign Application Priority Data

Mar. 12, 1998 [FR] France ................................ 98.03035

[51] Int. Cl.[7] ...................................................... F02K 1/70

[52] U.S. Cl. ...................... 60/226.2; 60/230; 244/110 B; 239/265.29; 239/265.31

[58] Field of Search ................................. 60/226.2, 230; 244/110 B; 239/265.19, 265.23, 265.27, 265.29, 265.31

[56] References Cited

U.S. PATENT DOCUMENTS

| | | | |
|---|---|---|---|
| 3,475,913 | 11/1969 | Mortlock . | |
| 4,858,430 | 8/1989 | Belbouche | 60/230 |
| 5,396,762 | 3/1995 | Standish | 60/226.2 |
| 5,671,598 | 9/1997 | Standish | 60/226.2 |
| 5,983,625 | 11/1999 | Gonidec et al. | 60/226.2 |

FOREIGN PATENT DOCUMENTS 0 822 327 2/1998 France .

*Primary Examiner*—Ted Kim
*Attorney, Agent, or Firm*—Bacon & Thomas PLLC

[57] ABSTRACT

A turbojet-engine thrust reverser comprising at least one pivoting hollow door (3) which in the forward-thrust mode is integrated into the external cowling and which in the thrust-reversal mode constitutes a flow-deflecting obstacle by forming a scoop. A movable deflecting cascade (23) comprising vanes is combined with each door (3). The movable cascade (23) hinges about a pivot (24) and comprises at least one upstream portion forming a deflector (26) projecting, in the thrust-reversal mode of the door (3), beyond the outer surface of an outer panel (4) of this door (3) in such manner that any interference between the exhaust flow from the door (3) and the flow deflected to the outside of the door (3) is avoided.

11 Claims, 6 Drawing Sheets

TURBO-JET ENGINE THRUST-REVERSER FITTED WITH SCOOP-DOORS LINKED TO A MOVABLE CASCADE

BACKGROUND OF THE INVENTION

1. Field of the Invention

The present invention relates to a bypass turbo-jet engine thrust reverser having a scoop-type door and at least one movable cascade.

2. Description of the Related Art

At the rear of a fan designed to channel the so-called cold, bypass flow, a turbojet engine is fitted with a duct 17 consisting of an inner wall enclosing the actual engine structure and an outer wall which is continuous with the engine cowling enclosing the fan. This outer wall is able to simultaneously channel the bypass flow and the primary flow to the rear of the exhaust of the so-called hot, primary flow as regards a mixed- or confluent-flow, but in other cases the outer wall may only channel the bypass flow as regards a separate flow.

Moreover, a wall may fair the outside of the casing enclosing the outside of the outer wall of the above described duct, namely for the purpose of minimizing powerplant drag. This is especially the case for powerplants which project from the aircraft, in particular when such powerplants are mounted under the wings or at the rear of the fuselage.

European patent document EP 0,822,327 A discloses an illustrative embodiment, shown in FIG. 1 of the attached drawings, of a scoop-door thrust-reverser used in a bypass turbojet engine.

The thrust reverser consists of a movable sub-assembly and a stationary structure. The movable sub-assembly consists of a hollow door 3 forming a movable portion 2 and constituting, when in the forward-thrust mode, part of the external cowling. The stationary structure consists of an upstream portion 6 upstream of the door 3, a downstream portion 7 downstream of the door 3, and beams linking the upstream portion 6 to the downstream portion 7, the stationary structure also being part of the external cowling.

At least one door 3 is mounted along a circumference on the external cowling and is pivotable, in a downstream portion of its side walls, on the beams, situated on each side of the door, linking the downstream portion 7 to the upstream portion 6 of the external cowling. The side walls connect the external part, i.e., the outer panel 4 of the door 3, which constitutes a part of the external cowling, to an inner part 5 of the door 3, which constitutes a part of the outer wall of the duct.

The stationary-structure's upstream portion 6 comprises a forward frame 8 which may be used as a rest for a control means to displace the door 3, for instance linear actuators. This displacement control means for the door 3 may also be situated elsewhere on the periphery of the door 3, for instance downstream of it. In the latter case, the stationary structure's downstream portion 7 shall serve as the rest for the control means.

When driven toward an open position, the door 3 tips in such manner that the door portion upstream of a door pivot 9 more or less completely obstructs the duct 17 while clearing a passage in the external cowling to allow flows 13 and 14 to be channeled in a centrifugal direction relative to the duct axis, on one hand into an inner duct or conduit 10 constituted by the structure of the door 3, and on the other hand between a deflecting edge of the stationary structure and the outer panel 4 of the door 3. The door's downstream part is thereby moved into the vicinity of the outside of the external cowling. The door's pivot angle is adjusted in such manner so as to allow exhausting of the flow so as to strongly reduce, even suppress, the forward thrust of the flow, and to generate a counter-thrust by generating an upstream-directed flow component **13*b***.

The outer panel 4 of the door 3 of the above described thrust reverser model comprises an exhaust path for flow 14 between the deflection edge and the outer surface of the panel 14. The flow 14 meets the flow **13*b* exhausting from the door's inner duct 10. By merging with this flow 13*b*, the flow 14 minimizes the forward direction assumed by the flow 13*b***.

French patent application 97.06943 solves this problem by using a movable baffle 5 positioned above the outer panel of the door 3 when the door opens so as to limit, or restrict any interference between the door's exhaust flow and the flow deflected by the door's outer panel. FIG. 2 shows an embodiment of this invention in the thrust-reversal position.

For reasons of seating and kinematics, the sort of baffle 5 described in French patent application 97.06943 will partly or totally cover the cascade vanes in the forward-thrust mode. During opening, at least the downstream part of the baffle starts from a blade-straddling position **5*a* and moves toward a position 5*b* in which it covers the door's outer panel 4. During the thrust-reversal operation, an exhaust aperture 15 for the door's flow 13 cannot be completely freed and thus cannot allow free thrust-reversal flow transmission. Consequently, performance problems may arise in the turbojet engine because the cross-section of the annular duct 17 obstructed by the door 3** might not be compensated by the flow-transmitting cross-section freed by the door.

The forward-thrust positioning of the baffle does not allow, or only with great difficulty, the optimal shape, as desired by expert, of the baffle 5.

Unless carefully applied, a sealing means 12 between the downstream zone of the baffle 5 and the outer panel 4 may entail some performance degradation due to part of the flow moving above the outer panel 4 toward the flow exhausting from the door 3.

The baffle 5 is driven by a linkage system mounted outside the sides of the door 3 and secured to the door. The guidance technique using four linkrods entails a multiplicity of drive parts and requires rigorous manufacture to attain the reliability required of the thrust reverser.

Lastly, the configuration of the stationary vanes is designed to secure optimal thrust-reversal performance. It is impossible to direct the flow forward in the manner considered optimal by expert during opening of the door 3.

SUMMARY OF THE INVENTION

One objective of the invention is to attain enhanced aerodynamic performance of the scoop door when in the reverse-thrust mode, and particularly during opening, without incurring the drawbacks of the known prior art.

Such goals are achieved in the invention by a turbojet-engine thrust-reverser fitted with one or more scoop doors of the above described kind, wherein each door is combined with at least one movable deflecting cascade hinging about a pivot. An upstream portion of the cascade forms a deflector that projects beyond an outer surface of the door's outer panel when the door is in the open position so that all interference between the door's exhaust flow and the flow deflected outside the door is avoided.

The design of the invention provides many advantages:

At the beginning of the thrust-reversal operation, the cascade mobility allows the vanes of the cascade to be oriented farther upstream than at the end of the opening operation. Consequently, that cross-section of the flow crossing the door structure is optimally guided, and because the direction of flow points less at the stationary fairing part covering the door's exhaust so as to create a plug effect, the aerodynamic efficacy of the thrust-reverser is improved;

Good reliability of the technology driving the movable cascade is achieved;

In the thrust-reversal position, sealing is established between the upstream edge of the movable cascade and the downstream edge of the outer door structure;

During the thrust-reversal mode, obstruction of part of the exhaust aperture of the flow exhausting from the door is avoided, and during the thrust-reversal opening, improved guidance of the door's exhaust flow is assured.

BRIEF DESCRIPTION OF THE DRAWINGS

Other features and advantages of the invention are elucidated in the following description of preferred embodiments of the invention with reference to the attached drawings, in which.

DETAILED DESCRIPTION OF THE PREFERRED EMBODIMENTS

Figure 1:
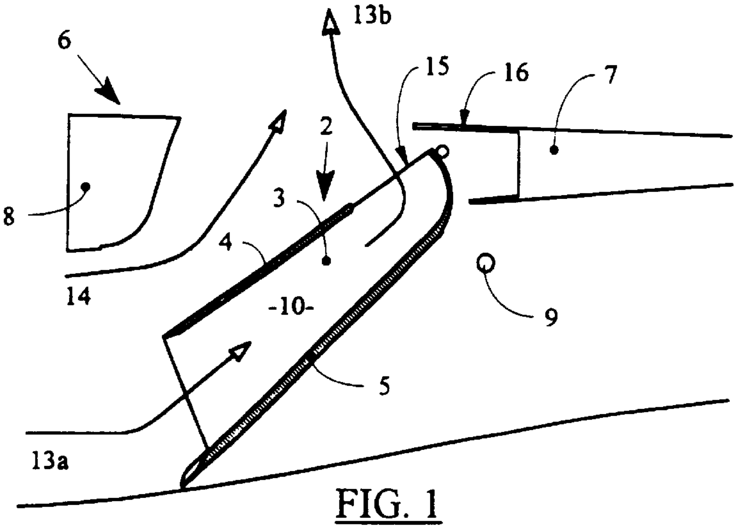
FIG. 1 is a semi-diagrammatic longitudinal section, in a plane through an axis of rotation of an associated turbojet engine, of a thrust reverser, fitted with pivoting scoop doors in an open position, of a known model and already described above.
Figure 2:
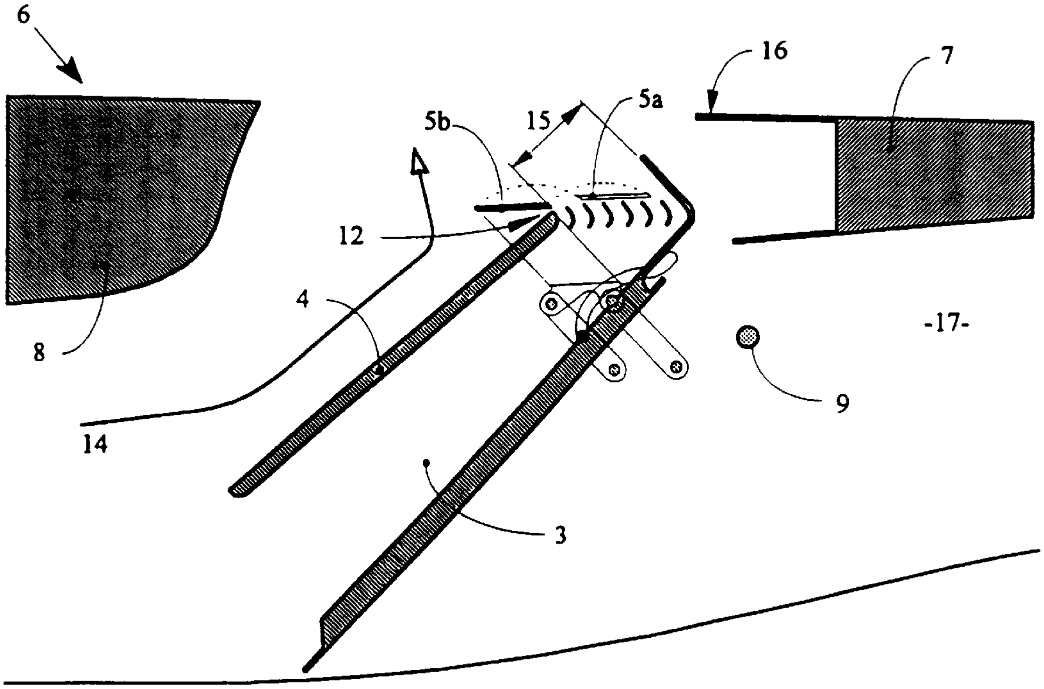
FIG. 2 is a view similar to that of FIG. 1 of a thrust reverser, fitted with scoop doors comprising a movable baffle, of a known type and already described above.
Figure 3:
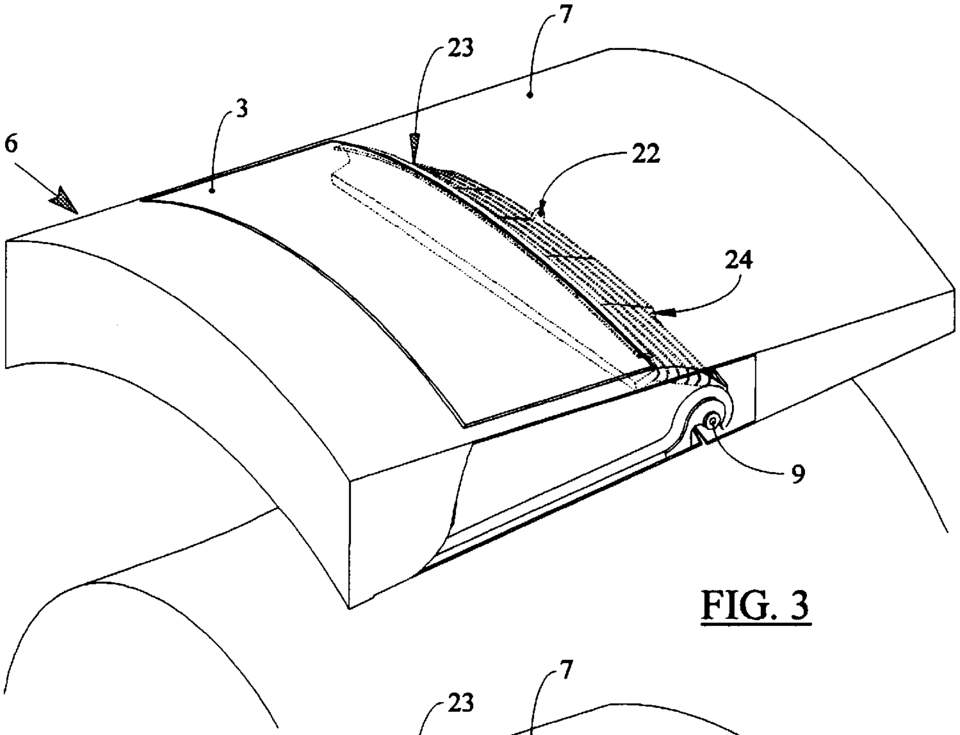
FIGS. 3, 4 are perspective views of the present invention shown in FIGS. 5 through 7.
Figure 4:
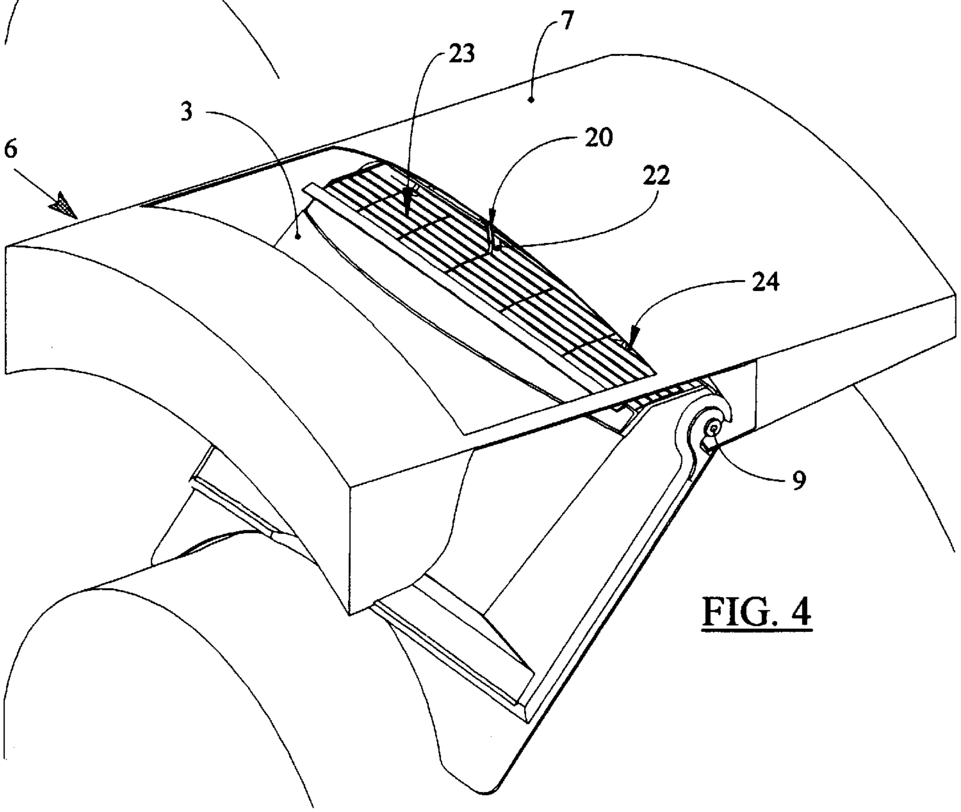
Figure 5:
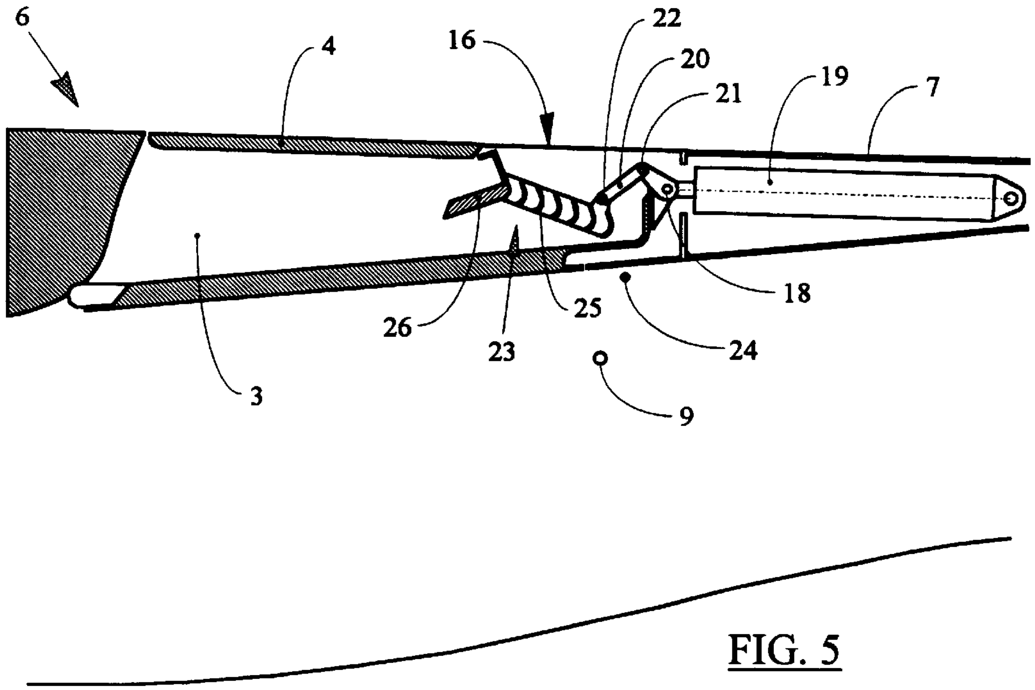
FIG. 5 is a view similar to that of FIG. 1 for the closed position of a thrust reverser according to the present invention.
Figure 6:
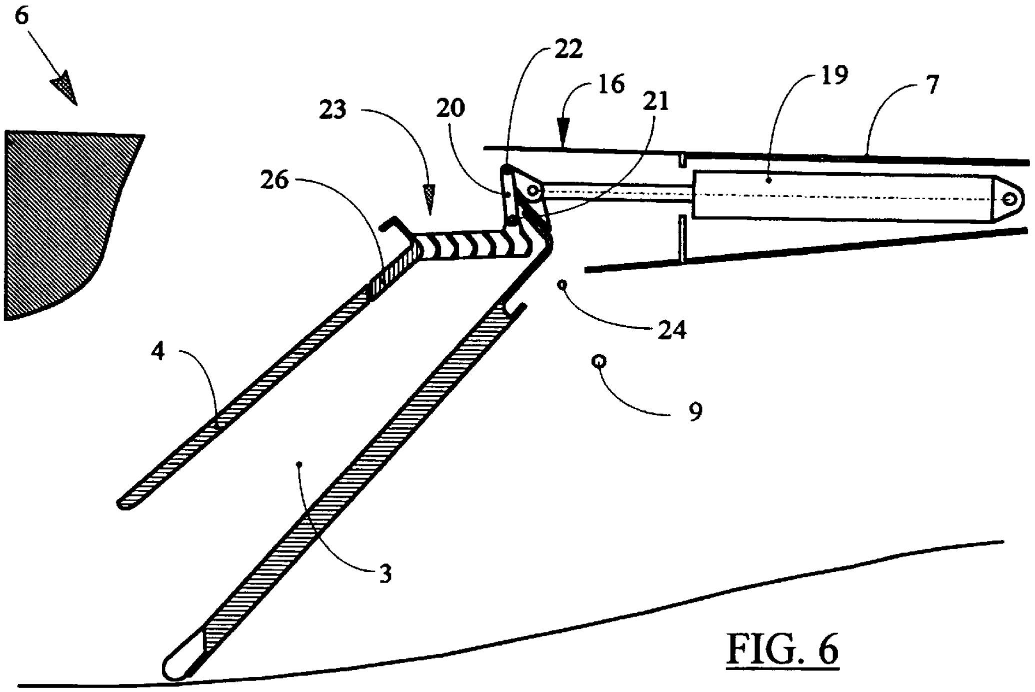
FIG. 6 is the embodiment of invention shown in FIG. 5 for the open position.

In one embodiment of the invention shown in FIGS. 3 through 7, a scoop door 3 of a bypass turbojet-engine thrust-reverser hinges about a door pivot shaft 9 resting on side beams of the thrust-reverser's stationary structure 6. Using at least one linkrod 20, a control system 19 of the door 3 drives a movable cascade 23, at a cascade drive point 21 and a cascade pivot point 22, the movable cascade 23 being hinged on a cascade pivot shaft 24 resting on the inner structure of the door 3. In the forward-thrust mode, the movable cascade 23 is situated inside the structure of the door 3, and the upstream portion of the stationary fairing 16 interfaces with the downstream end of an outer panel 4 of the door 3. The movable cascade 23 includes a plurality of vanes 25 of which an upstream portion forms a deflector 26 for exhaust flow during thrust reversal.

During opening, the control system or linear actuator 19 drives, at a door drive point 18, the door 3 into rotation about the door pivot shaft 9 and simultaneously begins to operate the linkrod 20 at cascade pivot point 22. In turn the linkrod 20, acting on cascade drive point 21, drives the movable cascade 23 into rotation about cascade pivot shaft 24 as far as a position determinable by the expert.

A suitably shaped extension on an upstream portion of the deflector 26 takes into account the play between the two moving parts.

The design of the extension of the deflector 26 may be used to form a stop against the outer panel 4 of the door 3 for the movable cascade 23 when in the thrust-reversal mode. This is particularly useful when the design of the vanes 25 allows driving and positioning of the cascade 23 solely by aerodynamic forces exerted on the structures of the vanes 25 by the deflected flow. An automatic return system may be added to such a design for greater operational reliability when closing the door 3.

Figure 7:
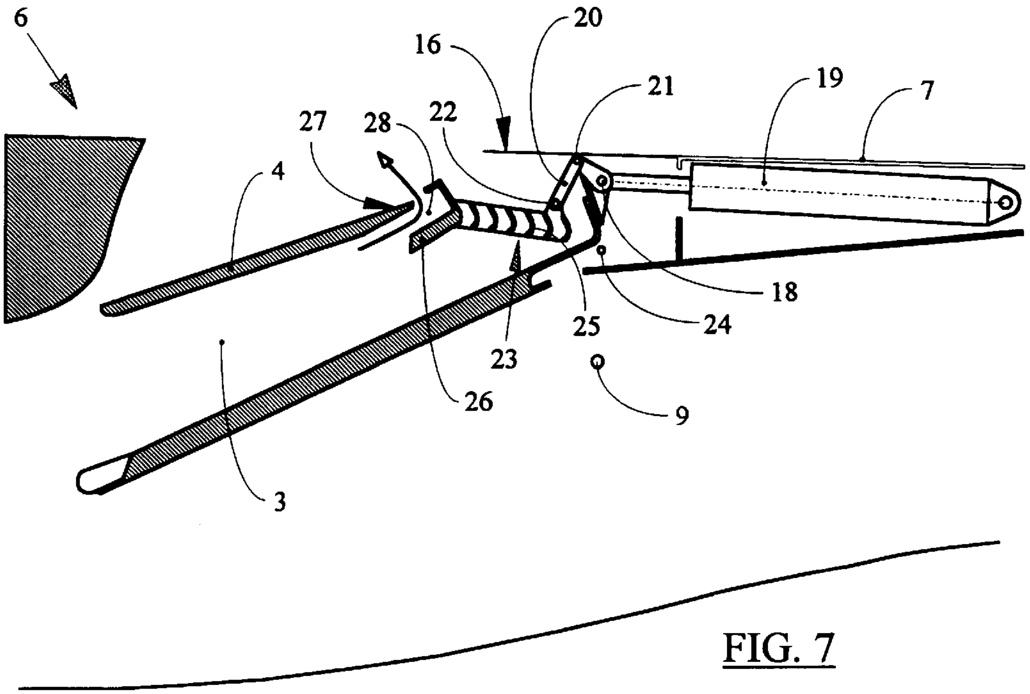
FIG. 7 is the embodiment shown in FIG. 5 when in an intermediate position.

During the opening operation shown in FIG. 7, the deflector 26 moves from an inner inactive position to an outer active one. Depending on the design geometry as shown, a space 28 is created between the upstream part of the deflector 26 and a downstream edge 27 of the outer panel 4 of the door 3. The thickness of the deflector 26 and the design of the downstream edge 27 may be designed to increase the space 28. This feature of the invention offers a larger exhaust cross-section of the thrust-reversal flow, in particular when the sensitive so-called 50% transition stage presents a slight deficiency between the intake cross-section of the fan flow and the exhaust cross-section which might entail some perturbation in the turbojet-engine operation.

Figure 8:
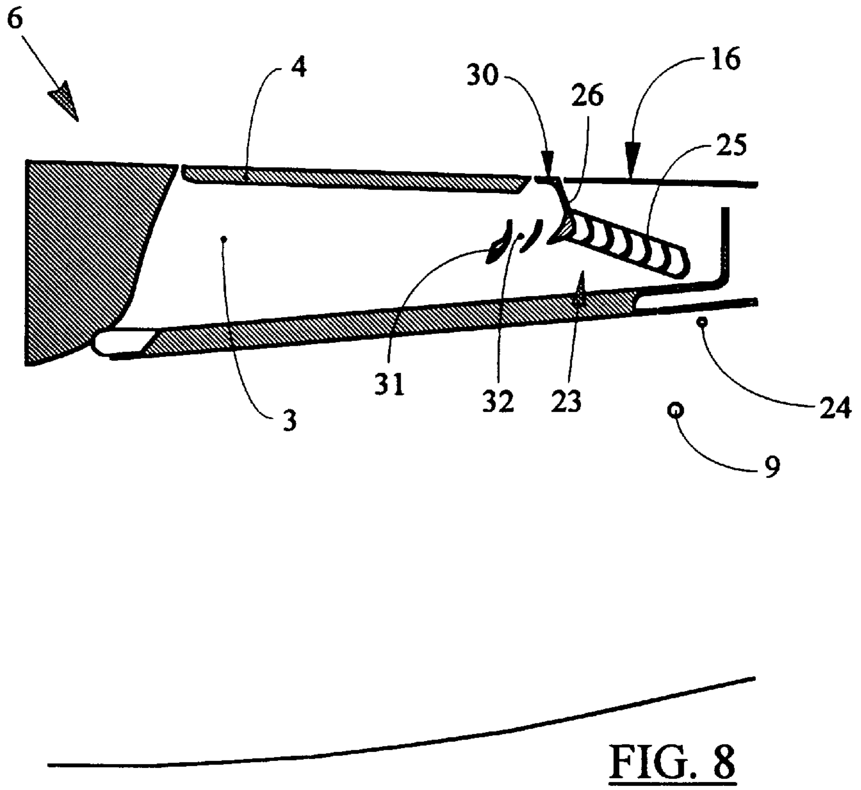
FIG. 8 is a view similar to that of FIG. 1 for the closed position of a thrust reverser according to another embodiment of the invention.
Figure 9:
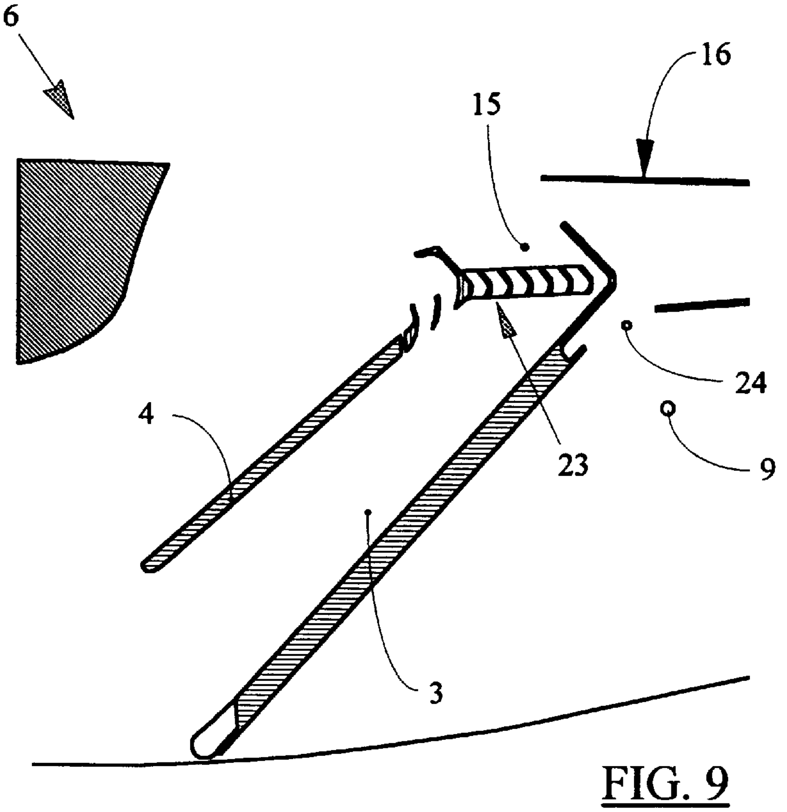
FIG. 9 is the embodiment shown in FIG. 8 for the open position.

FIGS. 8 and 9 show an embodiment of the invention with a particular design of the deflector 26. One way of increasing the useful height of the deflector 26 during thrust-reversal is to move an outer surface 30 of the deflector 26 into contact with the surface of the cowling, the outer surface 30 of the deflector 26 then becoming part of the aerodynamic lines of the cowling. In the thrust-reversal position, preferably an upstream portion of an upstream vane 31 assumes the position of the outer surface of the deflector 26 next to the outer panel 4 of the door 3.

This configuration moreover allows one to increase an exhaust cross-section 15 at the upstream side by the extension of the deflector 26 without elongating the upstream portion of the fairing 16, thereby avoiding obstructing part of the downstream exhaust cross-section of the door's exhaust cross-section 15 when in the thrust-reversal mode.

The extension of the deflector 26 may comprise at least one aperture 32 or an aperture combined with at least one upstream vane 31 to orient a part of the thrust-reversal flow crossing the aperture 32 in a desired direction. This aperture 32 may radially spread from one side edge to the other of the deflector 26. The aperture 32 may be partial in several segments, radially configured, as in this embodiment, or longitudinally configured. The part of the deflector 26 acting as a baffle against the flow also may be fitted with the same contrivances.

Figure 10:
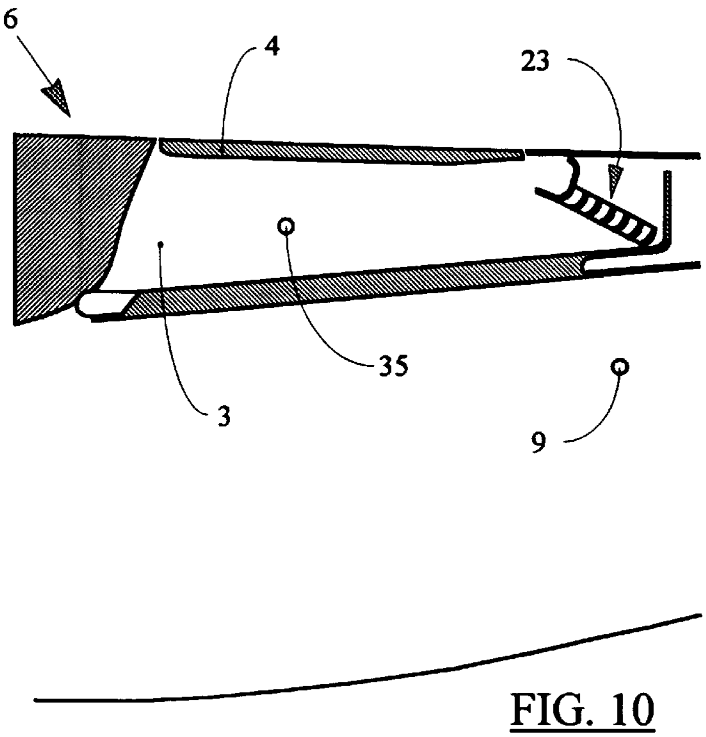
FIG. 10 is a view similar to that of FIG. 1 for the closed position of a thrust reverser according to yet another embodiment of the invention.
Figure 11:
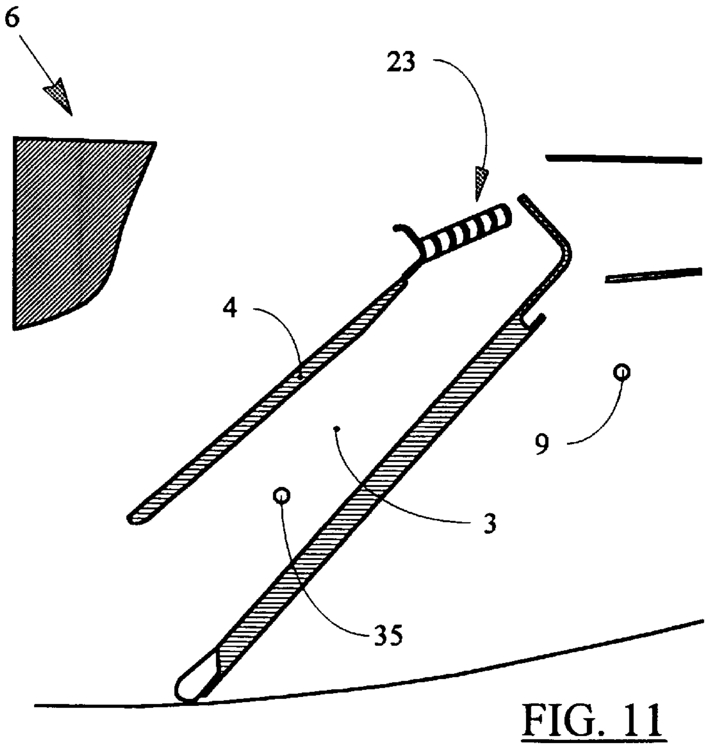
FIG. 11 is the embodiment shown in FIG. 10 for the open position.

FIGS. 10 and 11 show an embodiment of the invention wherein a cascade pivot shaft 35 is situated upstream of the door pivot shaft 9 of the door 3. The cascade pivot shaft 35 is located inside the inner door structure.

Advantageously, the cascade pivot shaft 35 is situated in an intermediate position of the width of the movable cascade 23. This pivot may be mounted on structurally reinforcing or flow-deflecting walls contained in the inner structure of the door 3, the walls having been defined in the previously described thrust-reverser fitted with scoop-doors.

The design and the parameters describing this embodiment are identical with those of the embodiment of the invention having the movable cascade 23 with a pivot downstream of the door pivot 9.

Depending on the particular applications, the door 3 furthermore may comprise a stationary cascade-structure portion cooperating with the movable cascade 23 to ensure the desired guiding and deflecting of the thrust-reversal flow.

I claim:

1. A thrust-reverser for a bypass turbojet-engine with an external cowling, comprising:

at least one hollow door (3) having an inner duct (10), an upstream end, a downstream end and an outer panel (4);

a displacement control system (19) which pivots the door (3) about a door pivot (9) between a closed position in a forward-thrust mode and an open position in a reverse-thrust mode, the door (3) constituting part of the external cowling when in the closed position, the upstream end of the door (3) extending inwardly from the external cowling so as to constitute a flow-deflecting means with at least a first portion of a deflected flow following the inner duct (10) when in the reverse-thrust mode; and at least one movable deflecting cascade (23) including a plurality of vanes (25) and hinging about a cascade pivot (24, 35), at least an upstream portion of the cascade (23) forming a deflector (26) which projects beyond an outer surface of the outer panel (4) of the door (3) when the door is in the open position so that a second portion of the deflected flow deflecting outside the door (3) avoids interference with the first portion of the deflected flow which is exhausted from the inner duct (10) of the door (3).

2. A thrust-reverser according to claim 1, wherein the pivot (24) rests on the downstream end of the door (3) when the door (3) is in the closed position.

3. A thrust-reverser according to claim 1, wherein the movable cascade (23) is situated inside the door (3) when the door (3) is in the closed position.

4. A thrust-reverser according to claim 1, wherein the upstream deflector (26) includes an extension which is situated in-line with the outer panel (4) of the door (3) when the door (3) is in the open position.

5. A thrust-reverser according to claim 4, wherein a downstream portion (27) of the outer panel (4) of the door (3) and the upstream deflector (26) have geometric features designed to form a passage (28) therebetween which transmits part of the first portion of the deflected flow when the door (3) is being pivoted between the closed position and the open position.

6. A thrust-reverser according to claim 1, wherein the upstream deflector (26) includes an outer part (30) which constitutes part of the external cowling downstream of the outer panel (4) of the door (3) when the door (3) is in the closed position.

7. A thrust reverser according to claim 1, wherein the upstream deflector (26) includes an upstream extension comprising at least one aperture (32) combined with at least one vane (31).

8. A thrust reverser according to claim 1, wherein the displacement control system (19) also drives the movable cascade (23) to pivot about its pivot (24).

9. A thrust reverser according to claim 8, wherein the displacement control system (19) includes a linear actuator, one end of the linear actuator being linked to the movable cascade (23) by at least one linkrod (20).

10. A thrust reverser according to claim 1, wherein the vanes (25) are designed such that the movable cascade (23) is driven to pivot into proper position for the reverse-thrust mode by aerodynamic forces exerted by the first portion of the deflected flow on the vanes (25); and wherein the movable cascade (23) includes an automatic return system to ensure its return into proper position for the forward-thrust mode.

11. A thrust-reverser according to claim 1, wherein the pivot (35) of the movable cascade (23) rests on the door (3) upstream of the door pivot (9) when the door (3) is in the open position.

* * * * *